United States Patent
Ashara

(10) Patent No.: US 11,204,887 B1
(45) Date of Patent: Dec. 21, 2021

(54) METHODS AND SYSTEMS FOR USING UART AND SINGLE WIRE PROTOCOLS

(71) Applicant: Texas Instruments Incorporated, Dallas, TX (US)

(72) Inventor: Amit Ashara, Wylie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/103,117

(22) Filed: Nov. 24, 2020

(51) Int. Cl.
  *G06F 13/42* (2006.01)
  *G06F 13/20* (2006.01)
  *G06F 13/38* (2006.01)

(52) U.S. Cl.
  CPC .......... *G06F 13/4226* (2013.01); *G06F 13/20* (2013.01); *G06F 13/385* (2013.01)

(58) Field of Classification Search
  CPC ..... G06F 13/20; G06F 13/385; G06F 13/4226
  See application file for complete search history.

(56) References Cited

U.S. PATENT DOCUMENTS

| | | | | |
|---|---|---|---|---|
| 2004/0165480 A1* | 8/2004 | Shemesh | ................. | G04G 5/00 368/46 |
| 2005/0185720 A1* | 8/2005 | Kwok | ..................... | H04B 3/50 375/257 |
| 2014/0237285 A1* | 8/2014 | Fredrickson | .............. | G06F 1/08 713/502 |
| 2015/0084598 A1* | 3/2015 | Song | ..................... | H02J 7/0047 320/128 |
| 2017/0329738 A1* | 11/2017 | Mishra | ................... | G06F 13/387 |
| 2018/0262595 A1* | 9/2018 | Perchlik | ............. | H04B 7/18502 |
| 2020/0327085 A1* | 10/2020 | Kang | .................. | G06F 13/4059 |
| 2021/0266193 A1* | 8/2021 | Bijjala | ............. | H04L 12/40013 |

* cited by examiner

*Primary Examiner* — Zachary K Huson
(74) *Attorney, Agent, or Firm* — John R. Pessetto; Charles A. Brill; Frank D. Cimino

(57) ABSTRACT

Methods and systems for data communication using the single wire communication protocol and the universal asynchronous receiver-transmitter (UART) communication protocol are disclosed. The method includes receiving by a first device a reset pulse. The method includes operating the first device in a standard speed single wire protocol if the width of the reset pulse is between 480 and 640 micro seconds. The method includes operating the first device in an overdrive speed single wire protocol if the width of the reset pulse is between 48 and 80 micro seconds. The method includes operating the first device in a universal asynchronous receiver-transmitter (UART) protocol if the width of the reset pulse is between 240 and 480 micro seconds. The method includes transmitting by the first device an answer responsive to the reset pulse. The method includes synchronizing the first device with a host device responsive to the reset pulse.

25 Claims, 4 Drawing Sheets

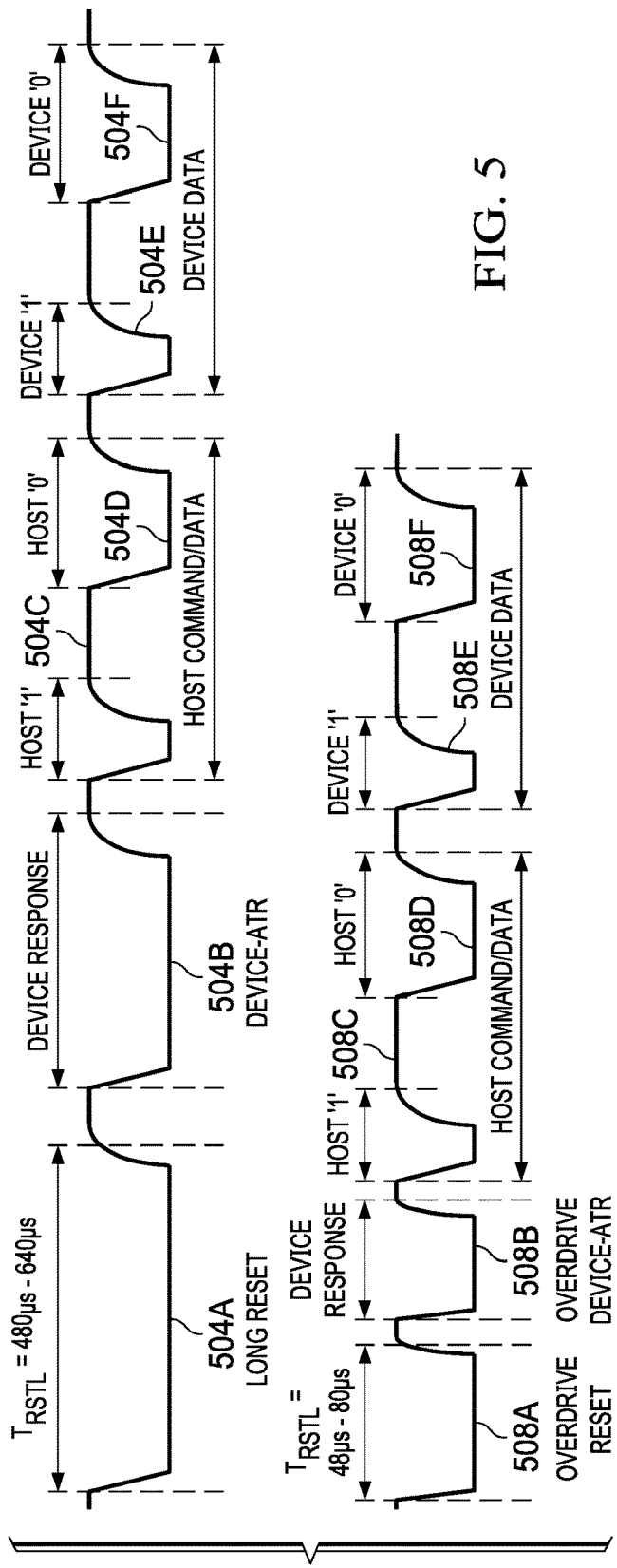
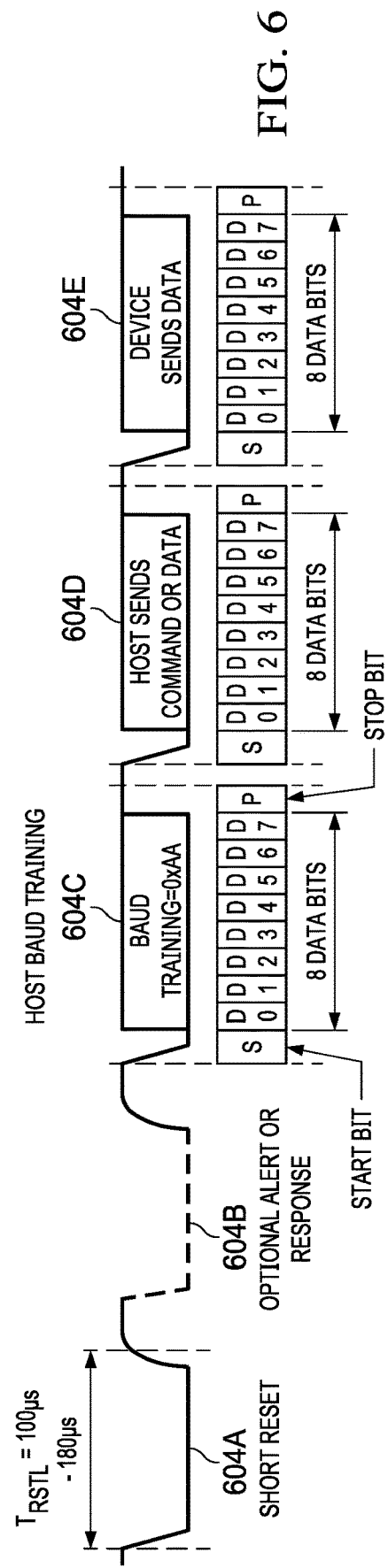
FIG. 5
FIG. 6

METHODS AND SYSTEMS FOR USING UART AND SINGLE WIRE PROTOCOLS

BACKGROUND

The disclosure generally relates to data communication and more particularly to methods and systems for using UART and single wire communication protocols.

DESCRIPTION OF THE RELATED ART

A single wire is a serial communication protocol that uses a single wire to transfer digital information (bits). The protocol allows a host device and one or more slave devices (e.g., peripheral devices) to transfer digital information only in one direction at a time (half duplex). The host device and the slave device can be a transmitter and a receiver. The host device initiates and controls single wire operations. The single wire protocol uses CMOS/TTL logic and operates at a wide range of supply voltage.

Serial transmission of digital information through a single wire is less costly than parallel transmission through multiple wires because the serial transmission requires only a single pin count while the parallel transmission requires a higher pin count. However, conventional or legacy single wire protocol requires input/output (I/O) bit banging software which must be configured to read and write inputs and handle timing. Also, the data transfer rate of the conventional or legacy single wire protocol is generally limited to a maximum rate of 120 kbps depending on the cable/trace length.

For increased data rates, the universal asynchronous receiver-transmitter (UART) single wire communication protocol is used in a wide range of hardware devices in half duplex mode. In the UART protocol, data format and transmission speed are configurable. A UART device may not directly generate or receive external signals between different devices. Separate interface circuits (e.g., driver circuits) are used to convert logic level signals of the UART to and from an external device. A UART host device takes bytes of data and transmits individual bits sequentially using a driver circuit. At the destination, a slave UART device receives the bits using a driver circuit and re-assembles the bits into complete bytes. In contrast to the conventional or legacy single wire protocol which allows transmission of only a single bit per time slot (e.g., 120 micro seconds), the UART protocol allows transmission of 8 bits per time slot. Due to UART's higher speed, a wide range of hardware devices (e.g., microcontrollers) are configured to communicate using the UART protocol. However, since many legacy slave devices are configured to operate only in the conventional single wire protocol, many systems have both conventional single wire compatible devices and UART compatible devices coupled to a UART host device.

SUMMARY

Various aspects of the present disclosure are directed to methods and systems for data communication using the single wire communication protocol and the universal asynchronous receiver-transmitter (UART) communication protocol. In one aspect, a method includes receiving by a first device a reset pulse. The method further includes operating the first device in a standard speed single wire protocol if the width of the reset pulse is between 480 and 640 micro seconds. The method also includes operating the first device in an overdrive speed single wire protocol if the width of the reset pulse is between 48 and 80 micro seconds. The method also includes operating the first device in a universal asynchronous receiver-transmitter (UART) protocol if the width of the reset pulse is between 240 and 480 micro seconds. The method also includes transmitting by the first device an answer responsive to the reset pulse. The method also includes transmitting data by a second device responsive to the answer from the first device. The method also includes synchronizing the first device with the second device responsive to the reset pulse.

In an additional aspect of the disclosure, a method of communication between a host device and one or more slave devices includes transmitting by the host device a reset pulse and receiving by a slave device the reset pulse. The method further includes determining the width of the reset pulse. The method also includes operating the slave device in a standard speed single wire protocol if the width of the reset pulse is between 480 and 640 micro seconds. The method also includes operating the slave device in an overdrive speed single wire protocol if the width of the reset pulse is between 48 and 80 micro seconds. The method also includes operating the slave device in a universal asynchronous receiver-transmitter (UART) protocol if the width of the reset pulse is between 240 and 480 micro seconds. The method also includes transmitting by the slave device an answer responsive to the reset pulse.

In an additional aspect of the disclosure, a data communication system includes a host device configured to provide a reset pulse through a transmit terminal and to receive an answer at a receive terminal. The system further includes a slave device configured to receive the reset pulse at an input/output (I/O) terminal and to provide the answer through the I/O terminal. The slave device includes a second terminal coupled to ground. The system also includes an NMOS transistor having a drain terminal coupled to the I/O terminal and the transmit terminal and having a source terminal coupled to ground. The NMOS transistor includes a gate terminal. The system also includes a pull-up resistor coupled between the drain terminal and a voltage supply terminal and includes an inverter having an input terminal coupled to the transmit terminal and having an output terminal coupled to the gate terminal. The slave device is configured to operate in a standard speed single wire protocol if the width of the reset pulse is between 480 and 640 micro seconds, and is configured to operate in an over drive speed single wire protocol if the width of the reset pulse is between 48 and 80 micro seconds, and is configured to operate in a universal asynchronous receiver-transmitter (UART) protocol if the width of the reset pulse is between 240 and 480 micro seconds.

In an additional aspect of the disclosure, the NMOS transistor is configured to turn ON responsive to the reset pulse being LOW and to drive the drain terminal to ground, and the NMOS transistor is configured to turn OFF responsive to the reset pulse being HIGH and to drive the drain terminal HIGH.

In an additional aspect of the disclosure, a data communication system includes a host device configured to provide a reset pulse through a transmit terminal and to receive an answer at a receive terminal. The system further includes a slave device configured to receive the reset pulse at an input/output (I/O) terminal and to provide the answer through the I/O terminal. The slave device includes a second terminal coupled to ground. The system also includes a PMOS transistor having a source terminal coupled to the I/O terminal and the transmit terminal and having a drain terminal coupled to ground. The PMOS transistor includes a gate terminal. The system also includes a pull-up resistor coupled between the source terminal and a voltage supply terminal and includes an inverter having an input terminal coupled to the transmit terminal and having an output terminal coupled to the gate terminal. The slave device is configured to operate in a standard speed single wire protocol if the width of the reset pulse is between 480 and 640 micro seconds, and is configured to operate in an overdrive speed single wire protocol if the width of the reset pulse is between 48 and 80 micro seconds, and is configured to operate in a universal asynchronous receiver-transmitter (UART) mode if the width of the reset pulse is between 240 and 480 micro seconds.

In an additional aspect of the disclosure, the PMOS transistor is configured to turn OFF responsive to the reset pulse being LOW and to drive the drain terminal HIGH, and the PMOS transistor is configured to turn ON responsive to the reset pulse being HIGH and to drive the drain terminal to ground.

BRIEF DESCRIPTION OF THE DRAWINGS

FIGS. 2-6 illustrate timing diagrams of waveforms.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Various aspects of the present disclosure are directed to methods and systems for data communication using the single wire communication protocol and the universal asynchronous receiver-transmitter (UART) communication protocol. In one aspect, the methods and systems enable a host device and one or more slave devices to communicate using both the conventional or legacy single wire communication protocol and the universal asynchronous receiver-transmitter (UART) communication protocol. Depending on the communication protocol used by the host device to transfer digital information (bits), the slave device selects between the UART protocol and the conventional or legacy single wire protocol.

Figure 1:
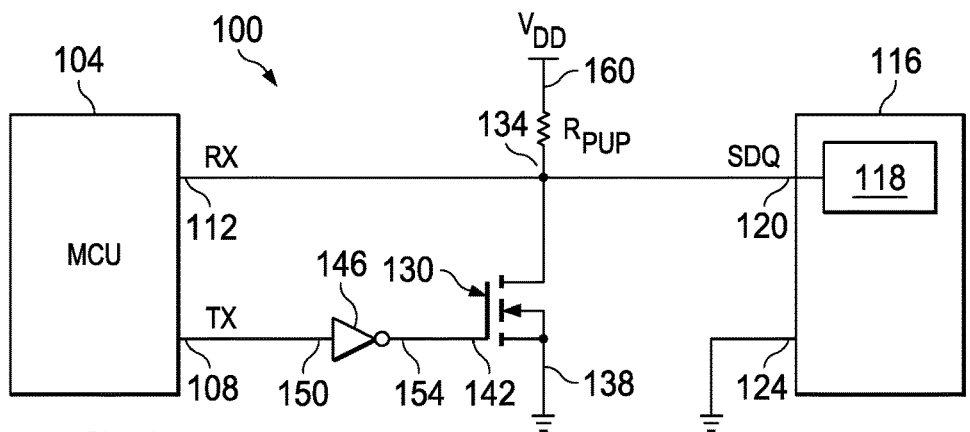
FIG. 1 illustrates a data communication system in accordance with an exemplary embodiment of the present disclosure.

FIG. 1 illustrates a data communication system 100 in accordance with an exemplary embodiment of the present disclosure. The system 100 includes a host device 104 (also referred to as a master 104) having a transmit terminal 108 and a receive terminal 112. The receive terminal 112 is coupled to a single wire bus 110. The host device 104 may, for example, be a microcontroller. The system 100 also includes a slave device 116 (also referred to as a peripheral device 116) having an input/output (I/O) terminal 120 coupled to the single wire bus 110. The slave device or peripheral device 116 includes a second terminal 124 coupled to ground.

With continuing reference to FIG. 1, the system 100 includes a transistor 130 having a first terminal 134 coupled to the bus 110 and having a second terminal 138 coupled to ground. The transistor 130 also includes a gate terminal 142 coupled to an output terminal 154 of an inverter 146. The inverter 146 includes an input terminal 150 coupled to the transmit terminal 108 of the host 104. The system 100 also includes a pull-up resistor $R_{PUP}$ coupled between the bus 110 and a voltage supply terminal 160 which can be coupled to a voltage supply $V_{DD}$.

In an exemplary embodiment, the transistor 130 is an NMOS transistor having a drain terminal (terminal 134) coupled to the bus 110 and having a source terminal (terminal 138) coupled to ground. In another exemplary embodiment, the transistor 130 is a PMOS transistor having a source terminal (terminal 134) coupled to the bus 110 and having a drain terminal (terminal 138) coupled to ground.

With continuing reference to FIG. 1, data transfer between the host device 104 and the slave device 116 is a bit-oriented operation with data read and write. The host device 104 initiates and controls four basic operations: (1) Reset; (2) Write bit 0-Send bit 0 to the slave device; (3) Write bit 1-Send bit 1 to the slave device; and (4) Read bit-Read a bit from the slave device. Most single wire devices support two data rates: a standard speed of about 15 kbps and a overdrive speed of about 70 kbps or more. A communication sequence starts when the host device 104 drives a defined Reset pulse. The slave device 116 responds to the Reset pulse with an answer pulse and synchronizes with the host device 116.

Reset Pulse: To send a Reset pulse to the slave device 116, the bus 110 is driven LOW and delayed for 480 micro seconds. The bus 110 is then released and delayed for 70 micro seconds.

Write Bit 0: To send bit 0 to the slave device 116, the bus 110 is driven LOW and delayed for 60 micro seconds. The bus 110 is then released and delayed for up to 120 micro seconds.

Write Bit 1: To send bit 1 to the slave device 116, the bus 110 is driven LOW and delayed for 6 micro seconds. The bus 110 is then released and delayed for up to 120 micro seconds.

Figure 2:
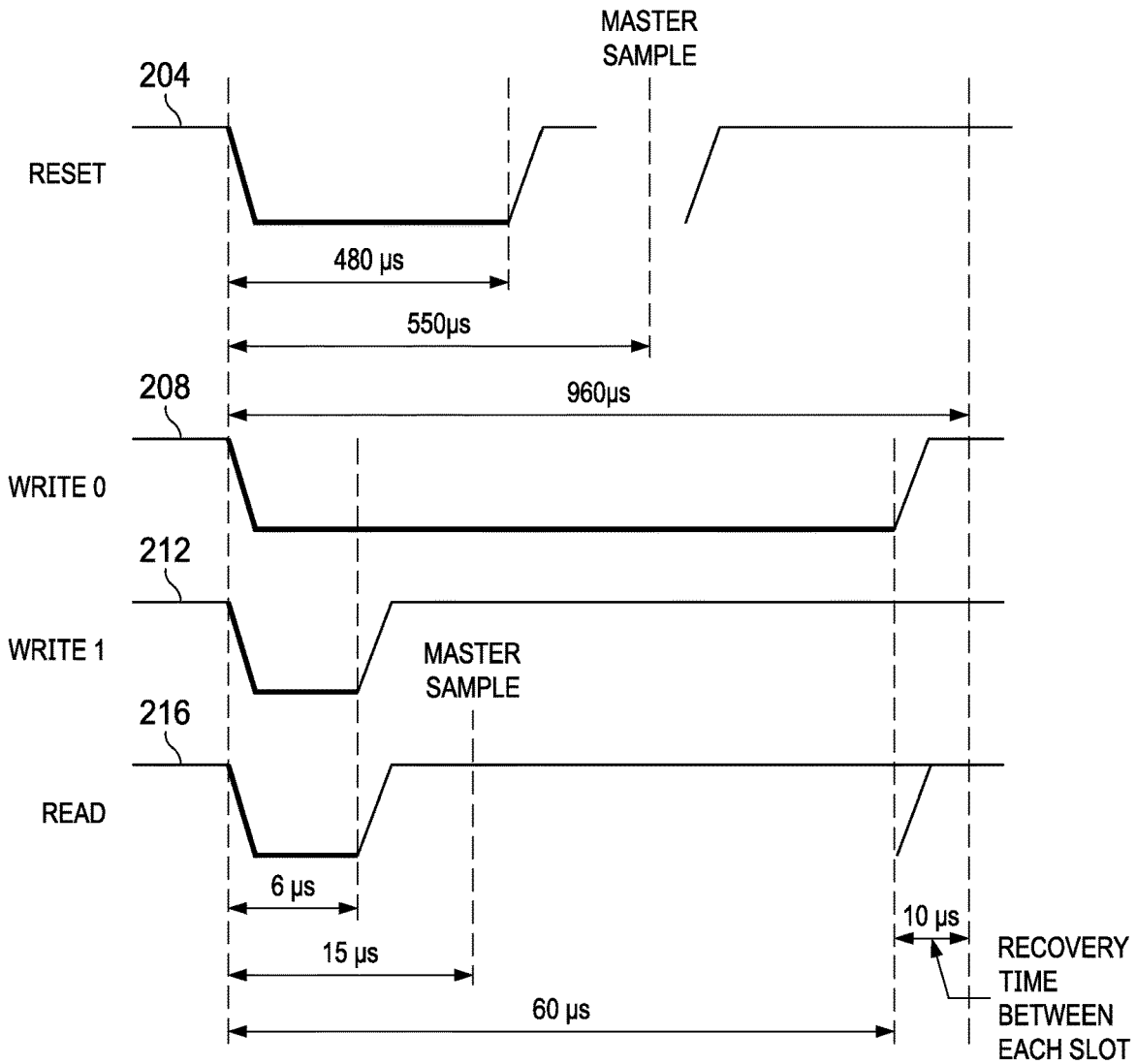

Read Bit: To read a bit from the slave device 116, the bus 110 is driven LOW and delayed for 6 micro seconds. The bus 110 is then released and delayed for up to 120 micro seconds. FIG. 2 illustrates timing diagrams of a Reset pulse 204, a Write bit 9 (208), a Write bit 1 (212), and a Read bit (216).

Figure 3:
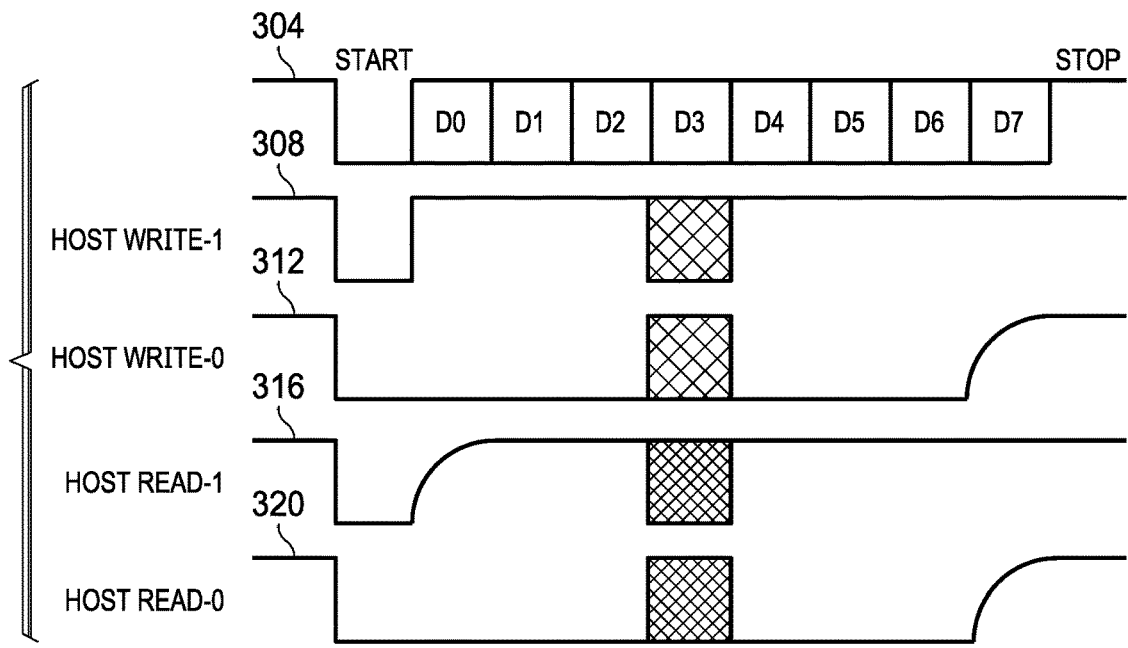

FIG. 3 illustrates timing diagrams of an exemplary time slot 304 and bits transferred in the time slot 304. The time slot 304 is divided into eight sample windows D0-D7 that can be used by the host device and the slave device to sample a bit. Under the conventional or legacy single wire protocol, a single bit is sent in the time slot 304, but under the UART protocol, 8 bits are sent in the time slot 304. In a pulse 308, the host device sends bit 1 (Host Write-1) in the sample windows D0-D7 which is sampled by the slave device in the sample window D3, and in a pulse 312, the host device sends bit 0 (Host Write-0) in the sample windows D0-D7 which is sampled by the slave device in the sample window D3. In a pulse 316, the host device receives bit 1 (Host Read-1) which is sampled in sample window D3, and in a pulse 320, the host device receives bit 0 (Host Read-0) which is sampled in the sample window D3. Although in the exemplary embodiment of FIG. 3, the bits are sampled by the host device and the slave device in the sample window D3, any one of the sample windows D0-D7 can be used to sample the bits. The receiving device encodes the transmitted signal as logic 0 (bit 0) or logic 1 (bit 1) depending on the percentage of time the signal is LOW. For example, in a given time slot, if the transmitted signal is LOW at least 90% of the duration, the signal is encoded as logic 0 (bit 0), and if the transmitted signal is LOW 10% of the duration or less, the signal is encoded as logic 1 (bit 1).

Figure 4:
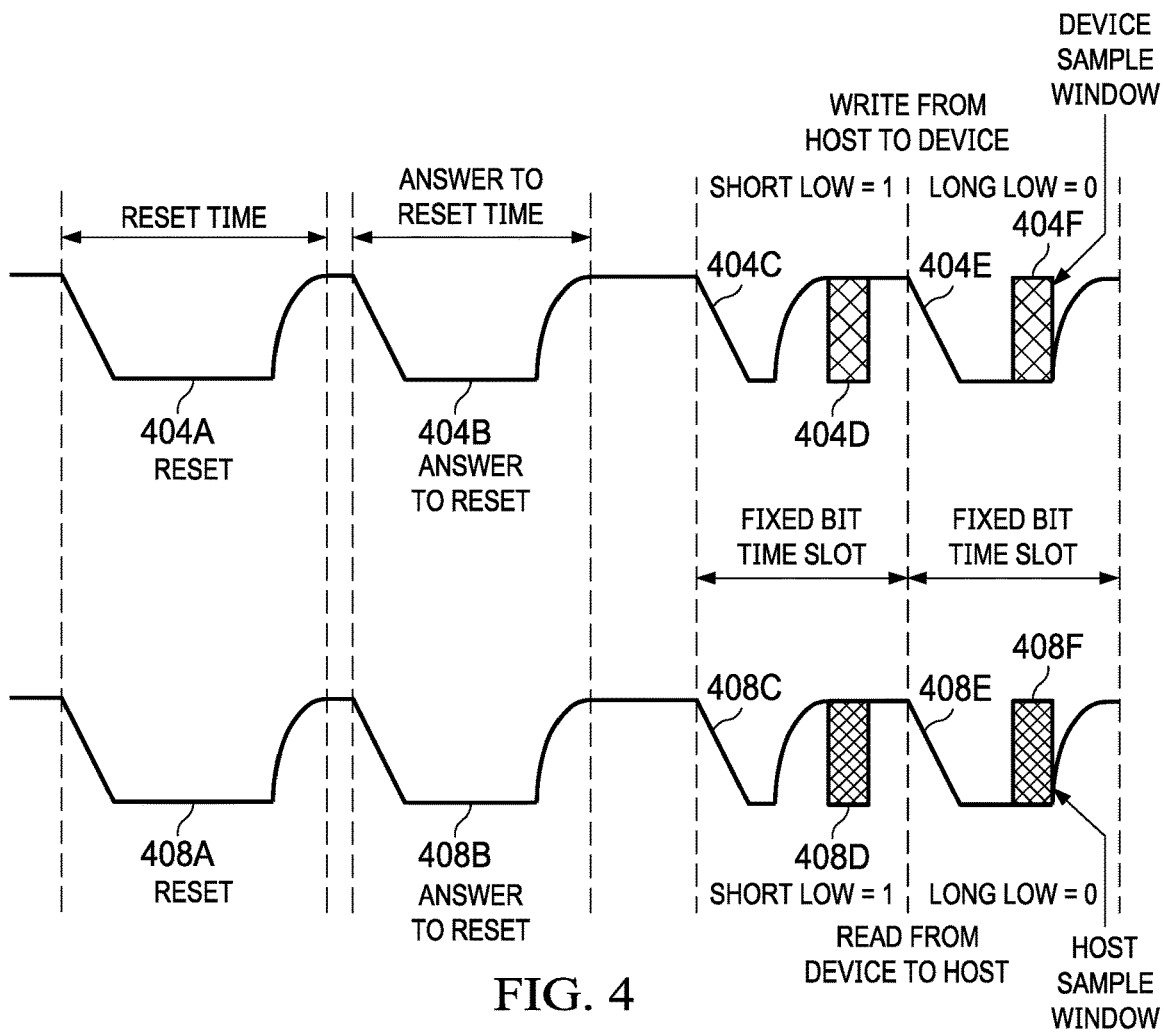

FIG. 4 illustrates timing diagrams of a sequence of pulses in a write and a read operation. A write operation starts when the host device 104 sends a Reset pulse 404A over the single wire bus followed by an answer 404B from the slave device 116. The host device 104 then sends bit 1 404C which is sampled by the slave device 116 in a sample window 404D. The host device 104 then sends bit 0 404E over the bus which is sampled by the slave device 116 in a sample window 404F. A read operation starts with a Reset pulse 408A followed by an answer 408B from the slave device 116. The slave device 116 sends bit 1 408C which is sampled by the host device 104 in the sampling window 408D. The slave device 116 then sends bit 0 408E which is sampled by the host device 104 in the sampling window 408F.

As discussed before, the conventional single wire protocol allows transfer of only one bit per time slot, but the UART protocol allows transfer of 8 bits in a time slot. Embodiments of the present disclosure enable a system such as, for example, the system 100 to switch between the conventional single wire or the UART protocol relying on the same hardware interface. Thus, the host device 104 can send bits over the bus 112 using the legacy single wire protocol or using the UART protocol. The slave device 116 identifies the communication protocol and switches between the legacy single wire protocol or the UART protocol.

In accordance with an exemplary embodiment of the present disclosure, the width of the Reset pulse is used to determine whether to operate in the conventional single wire protocol or the UART protocol. Also, the width of the Reset pulse is used to set the speed (standard speed or overdrive speed) of the single wire protocol.

In an exemplary embodiment, a reset pulse detector 118 in the slave device 116 measures the width of the Reset pulse. If the width of the Reset pulse is between 480 micro seconds and 640 micro seconds, the slave device is operated in accordance with the standard speed single wire protocol. If the width of the Reset pulse is between 48 micro seconds and 80 micro seconds, the slave device is operated in accordance with the overdrive single wire protocol.

FIG. 5 shows timing diagrams of waveforms in standard speed and overdrive single wire protocols in accordance with an exemplary embodiment. For the standard speed single wire protocol, the host device sends a Reset pulse 504A having a width between 480 micro seconds and 640 micro seconds, followed by an answer 504B from the slave device. The slave device switches to the standard speed single wire protocol. The host device performs two write operations: transmits bit 1 (504C) and then transmits bit 0 (504D). Thereafter, the host device performs two read operations: receives bit 1 (504E) and then receives bit 0 (504F).

For the overdrive single wire protocol, the host device sends a Reset pulse 508A having a width between 48 micro seconds and 80 micro seconds, followed by an answer 508B from the slave device. The slave device switches to the overdrive single wire protocol. The host device performs two write operations: transmits bit 1 (508C) and then transmits bit 0 (508D). Thereafter, the host performs two read operations: receives bit 1 (508E) and then receives bit 0 (508F).

FIG. 6 shows timing diagrams of waveforms in the UART protocol. For the UART protocol, the host device sends a Reset pulse 604A having a width between 240 micro seconds and 480 micro seconds and receives an optional alert or response 604B. The host device then sends a Baud Rate Training Pattern 604C to enable the slave device to align (i.e., synchronize) its internal clock to decode UART frames. The host device then sends a host command or data 604D. The host device then receives data 604E from the slave device.

Figure 7:
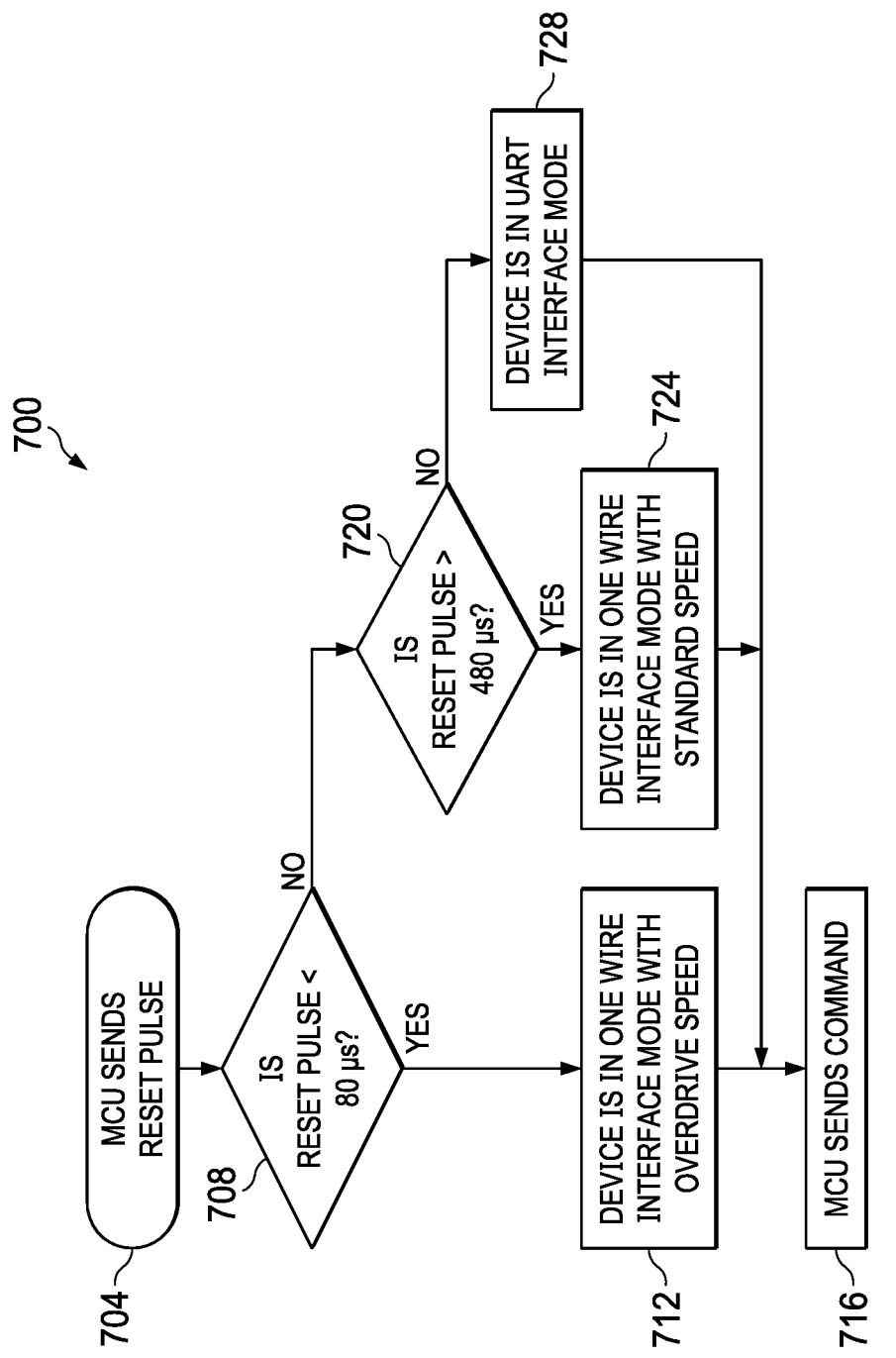
FIG. 7 is a flow diagram of a method in accordance with an exemplary embodiment of the present disclosure.

FIG. 7 is a flow diagram 700 of a method in accordance with an exemplary embodiment. In a block 704, the host device 104 sends a Reset pulse over the bus 112. The slave device 116 receives the Reset pulse and in a block 708 determines if the width of the Reset pulse is less than 80 micro seconds. If the width of the Reset pulse is less than 80 micro seconds, in a block 712 the slave device 116 switches to the overdrive speed single wire protocol, and in a block 716 the slave device 116 receives command and data sent by the host device.

If, in the block 708, the slave device 116 determines the width of the Reset pulse in not less than 80 micro second, the flow moves to a block 720 where the slave device 116 determines if the width of the Reset pulse is greater than 480 micro seconds. If the width of the Reset pulse is greater than 480 micro seconds, the slave device 116 switches to the standard speed single wire protocol in a block 724. If the width of the Reset pulse is not greater than 480 micro seconds, the slave device 116 switches to the UART protocol mode in a block 728. The flow moves to the block 716 where commands and data are received by the slave device 116.

Thus, only if the width of the Reset pulse is between 240 micro seconds and 480 micro seconds, the slave device 116 is operated in the UART mode. Since the width of the Reset pulse for the standard speed single wire protocol is between 480 micro seconds and 640 micro seconds and the width of the Reset pulse for the overdrive speed single wire protocol is between 48 micro seconds and 80 micro seconds, a pulse width in the range of 240-480 micro seconds is reserved for the UART mode, thus allowing the slave device 116 to recognize that the host device 104 intends to communicate in the UART protocol.

With reference to FIG. 1, the operation of the system 100 will now described. Consider, for example, the transistor 130 is an NMOS transistor. To perform a write 0 operation, the host device 104 drives the transmit terminal 108 LOW which causes the output 154 of the inverter 146 to be driven HIGH. The gate terminal 142, which is coupled to the output 154, is also driven HIGH, causing the NMOS transistor to turn ON and provide a conduction path. As a result, the drain terminal 134 is driven LOW, causing the bus 112 to also be driven LOW. Thus, bit 0 appears at the I/O terminal 120.

To perform a write 1 operation, the host device 104 drives the transmit terminal 108 HIGH which causes the output 154 of the inverter 146 to be driven LOW. Thus, the gate terminal 142, which is coupled to the output 154, is also driven LOW, causing the NMOS transistor to turn OFF. As a result, the drain terminal 134 is driven HIGH, causing the bus 112 to also be driven HIGH. Thus, bit 1 appears at the I/O terminal 120 of the slave device 116.

To perform a read 0 operation, the slave device 116 drives the I/O terminal 116 LOW, causing the bus 112 to be driven LOW. Thus, bit 0 appears at the receive terminal 112. When the I/O terminal 120 is driven LOW, a low resistance path from the voltage supply $V_{DD}$ to the I/O terminal is created causing current to flow from the voltage supply $V_{DD}$ to the I/O terminal 120. However, the pull up resistor $R_{PUP}$ limits current flowing from the voltage supply $V_{DD}$ to the I/O terminal 120.

To perform a read 1 operation, the slave device 116 drives the I/O terminal 116 HIGH, causing the bus 112 to be driven HIGH. Thus, bit 1 appears at the receive terminal 112.

Consider, for example, the transistor 130 is a PMOS transistor. To perform a write 0 operation, the host device 104 drives the transmit terminal 108 HIGH which causes the output 154 of the inverter 146 to be driven LOW. The gate terminal 142, which is coupled to the output of the inverter 146, is also driven LOW, causing the PMOS transistor to turn ON and the source terminal 134 to be driven LOW. As a result, the bus 112 is driven LOW. Thus, bit 0 appears at the I/O terminal 120.

To perform a write 1 operation, the host device 104 drives the transmit terminal 108 LOW which causes the output 154 of the inverter 146 to be driven HIGH. Thus, the gate terminal 142, which is coupled to the output 154, is also driven HIGH, causing the PMOS transistor to turn OFF. As a result, the source terminal 134 is driven HIGH, causing the bus 112 to be driven HIGH. Thus, bit 1 appears at the I/O terminal 120. To read bit 0, the slave device 116 drives the I/O terminal 120 LOW, causing the bus 112 to be driven LOW. Thus, bit 0 appears at the receive terminal 112. To read bit 1, the slave device 116 drives the I/O terminal 120 HIGH, causing the bus 112 to be driven HIGH. Thus, bit 1 appears at the receive terminal 112.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A method comprising:
   receiving by a first device a reset pulse;
   operating the first device in a standard speed single wire protocol if the width of the reset pulse is between 480 and 640 micro seconds;
   operating the first device in an overdrive speed single wire protocol if the width of the reset pulse is between 48 and 80 micro seconds; and
   operating the first device in a universal asynchronous receiver-transmitter (UART) protocol if the width of the reset pulse is between 240 and 480 micro seconds.

2. The method of claim 1, wherein the reset pulse is transmitted by a second device.

3. The method of claim 2, wherein the second device is a host device.

4. The method of claim 2, wherein the first device is a slave device.

5. The method of claim 1, further comprising transmitting by the first device an answer responsive to the reset pulse.

6. The method of claim 1, further comprising transmitting by the second device data responsive to the answer from the first device.

7. The method of claim 1, further comprising synchronizing the first device with a host device responsive to the reset pulse.

8. A method of communication between a host device and one or more slave devices, the method comprising:
   transmitting by the host device a reset pulse;
   receiving by a slave device the reset pulse;
   determining the width of the reset pulse;
   operating the slave device in a standard speed single wire protocol if the width of the reset pulse is between 480 and 640 micro seconds;
   operating the slave device in an overdrive speed single wire protocol if the width of the reset pulse is between 48 and 80 micro seconds;
   operating the slave device in a universal asynchronous receiver-transmitter (UART) protocol if the width of the reset pulse is between 240 and 480 micro seconds; and
   transmitting by the slave device an answer responsive to the reset pulse.

9. The method of claim 8, further comprising synchronizing the slave device with the host device responsive to the reset pulse.

10. The method of claim 8, further comprising transmitting by the second device data responsive to the answer from the first device.

11. A data communication system, comprising:
    a host device configured to provide a reset pulse through a transmit terminal and to receive an answer at a receive terminal;
    a slave device configured to receive the reset pulse at an input/output (I/O) terminal and to provide the answer through the I/O terminal, the slave device having a second terminal coupled to ground;
    an NMOS transistor having a drain terminal coupled to the I/O terminal and the transmit terminal and having a source terminal coupled to ground, the NMOS transistor having a gate terminal;
    a pull-up resistor coupled between the drain terminal and a voltage supply terminal;
    an inverter having an input terminal coupled to the transmit terminal and having an output terminal coupled to the gate terminal,
    wherein the slave device is configured to operate in a standard speed single wire protocol if the width of the reset pulse is between 480 and 640 micro seconds, and wherein the slave device is configured to operate in an over drive speed single wire protocol if the width of the reset pulse is between 48 and 80 micro seconds, and wherein the slave device is configured to operate in a universal asynchronous receiver-transmitter (UART) protocol if the width of the reset pulse is between 240 and 480 micro seconds.

12. The data communication system of claim 11, wherein the NMOS transistor is configured to turn ON responsive to the reset pulse being LOW and to drive the drain terminal to ground.

13. The data communication system of claim 11, wherein the NMOS transistor is configured to turn OFF responsive to the reset pulse being HIGH and to drive the drain terminal HIGH.

14. The data communication system of claim 11, wherein the host device is a microcontroller.

15. The data communication system of claim 11, wherein the slave device is configured to synchronize with the host device responsive to the reset pulse.

16. The data communication system of claim 11, wherein the host device is configured to transmit data responsive to the answer from the slave device.

17. The data communication system of claim 11, wherein the receive terminal is coupled to the I/O terminal.

18. The data communication system of claim 11, wherein the slave device is a peripheral device.

19. A data communication system, comprising:
a host device configured to provide a reset pulse through a transmit terminal and to receive an answer at a receive terminal;
a slave device configured to receive the reset pulse at an input/output (I/O) terminal and to provide the answer through the I/O terminal, the slave device having a second terminal coupled to ground;
a PMOS transistor having a source terminal coupled to the I/O terminal and the transmit terminal and having a drain terminal coupled to ground, the PMOS transistor having a gate terminal;
a pull-up resistor coupled between the source terminal and a voltage supply terminal;
an inverter having an input terminal coupled to the transmit terminal and having an output terminal coupled to the gate terminal,
wherein the slave device is configured to operate in a standard speed single wire protocol if the width of the reset pulse is between 480 and 640 micro seconds, and wherein the slave device is configured to operate in an overdrive speed single wire protocol if the width of the reset pulse is between 48 and 80 micro seconds, and wherein the slave device is configured to operate in a universal asynchronous receiver-transmitter (UART) mode if the width of the reset pulse is between 240 and 480 micro seconds.

20. The data communication system of claim 19, wherein the PMOS transistor is configured to turn OFF responsive to the reset pulse being LOW and to drive the drain terminal HIGH.

21. The data communication system of claim 19, wherein the PMOS transistor is configured to turn ON responsive to the reset pulse being HIGH and to drive the drain terminal to ground.

22. The data communication system of claim 19, wherein the host device is a microcontroller.

23. The data communication system of claim 19, wherein the slave device is configured to synchronize with the host device responsive to the reset pulse.

24. The data communication system of claim 19, wherein the host device is configured to transmit data responsive to the answer from the slave device.

25. The data communication system of claim 19, wherein the slave device is a peripheral device.

* * * * *